(12) United States Patent
Olaleye et al.

(10) Patent No.: US 12,230,020 B2
(45) Date of Patent: Feb. 18, 2025

(54) TECHNIQUES FOR DYNAMIC TIME-BASED CUSTOM MODEL GENERATION

(71) Applicant: Oracle International Corporation, Redwood Shores, CA (US)

(72) Inventors: Olaitan Olaleye, Millburn, NJ (US); Arunjeyan T V Seshier Venkatachalapathy, Bengaluru (IN); Jinghou Zhang, Sammamish, WA (US); Jun Qian, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 430 days.

(21) Appl. No.: 17/586,583

(22) Filed: Jan. 27, 2022

(65) Prior Publication Data

US 2023/0237787 A1     Jul. 27, 2023

(51) Int. Cl.
   *G06V 10/82* (2022.01)
   *G06N 3/086* (2023.01)
   *G06V 10/774* (2022.01)
   *G06V 10/778* (2022.01)

(52) U.S. Cl.
   CPC ............ *G06V 10/82* (2022.01); *G06N 3/086* (2013.01); *G06V 10/774* (2022.01); *G06V 10/7788* (2022.01)

(58) Field of Classification Search
   CPC .. G06V 10/82; G06V 10/774; G06V 10/7788; G06N 3/086; G06N 3/045; G06N 3/08; G06N 3/082; G06N 3/084; G06N 3/126; G06N 5/01
   See application file for complete search history.

(56) References Cited

U.S. PATENT DOCUMENTS

| | | | |
|---|---|---|---|
| 10,810,512 B1* | 10/2020 | Wubbels | G06N 20/00 |
| 2019/0095785 A1* | 3/2019 | Sarkar | G06N 20/00 |
| 2019/0220738 A1* | 7/2019 | Flank | G16H 50/20 |
| 2020/0184380 A1* | 6/2020 | Thomas | G06N 3/063 |

OTHER PUBLICATIONS

Zhong et al., "Anchor Box Optimization for Object Detection", Computer Vision, Jan. 26, 2020, 9 pages.

\* cited by examiner

*Primary Examiner* — Siamak Harandi
(74) *Attorney, Agent, or Firm* — Kilpatrick Townsend & Stockton LLP

(57) ABSTRACT

Techniques are disclosed for dynamic time-based custom model generation as part of infrastructure-as-a-service (IaaS) environment. A custom model generation service may receive a set of training data and a time-based constraints for training a machine learning model. The custom model generation service may subsample the training data and generate a set of optimized tuned hyperparameters for a machine learning model to be trained using the subsampled training data. An experimental interval time of training is determined and the machine learning model is trained on the subsampled training data according to the optimized tuned hyperparameters over a set of training intervals similar to the experimental time interval. A customized machine learning model trained in the time-based constraint is output. The hyperparameter tuning may be performed using a modified mutating genetic algorithm for a set of hyperparameters to determine the optimized tuned hyperparameters prior to the training.

18 Claims, 12 Drawing Sheets

TECHNIQUES FOR DYNAMIC TIME-BASED CUSTOM MODEL GENERATION

BACKGROUND

Machine-learning models are employed to solve a variety of problems in numerous fields. Examples of machine learning model uses include modelling to produce better data clustering, predictive analysis, natural language processing, computer vision, entity recognition, etc. A machine learning model is configured to "learn" from a training dataset and the associated "ground-truth" labels according to specified hyperparameters for training. The hyperparameters determine the manner in which the model is configured and subsequently trained so that the model experiences better optimization and learning towards finding the best (optimal) solution. Once trained, the model can infer i.e., accept an input dataset, which maybe similar to the training datasets, process the input dataset, and output a prediction result that includes a predicted label that relates to the input.

Accurately training a machine learning model is a difficult task and often requires careful optimization of the training hyperparameters. A comprehensive training dataset is often required to train a model robustly as well. Training a machine learning model can also be a resource intensive process that is also more efficient on particular hardware infrastructures, and the training resources required are exponentially more when large amounts of data and evaluation of different training hyperparameters are involved. Thus, training a machine learning model is often performed by a dedicated entity on behalf of a requestor, also referred to as a client or customer, using their own training dataset. This arrangement is especially effective as a cloud-based service, wherein a client may delegate the task of training a model to a cloud-based service provider who will generate and train the model using optimized and dedicated computing resources that the client usually does not have access to.

For example, a client may desire to utilize a machine learning model such as a convolutional neural network (CNN) machine learning model to detect and categorize objects in a digital image when the digital image is given to the CNN as input. The client may own or otherwise generate training datasets that may be used to train such a CNN machine learning model to detect objects in an input dataset (e.g., various digital images of cars in which the cars are detected and labelled for the model the learn from). However, the client may not have personal access to an adequate computer infrastructure or knowledge on how to get optimized hyperparameters to train the CNN. A cloud-services provider may use the client's training dataset and generate and train the CNN model on their behalf commercially.

Training a machine learning model is not a deterministic process, as there is no definite period of time or known configuration in which a machine learning model has been "fully-trained," or optimized such that the models accuracy with label prediction is sufficient. A cloud-services provider will attempt to optimize a model by testing and determining hyperparameters for training the model and performing various phases of training with the training dataset. It is very difficult to predict at what point a machine learning model has been properly "trained" to provide permissible results given an input dataset. A highly-trained model with optimized hyperparameters will generate more accurate results, but the training period will often take a significant amount of time, stretching into days or even weeks of constant training depending on the size of the dataset. Tuning the hyperparameters to optimize the training process is also a time intensive task. Thus, clients are often forced to choose between an less-accurate model generated in a shorter period of time using less training data, or a more-accurate model generated in a longer period of time.

The problems above are compounded when a cloud-services provider generates the model on behalf of a client. In one example, a client may specify that the model must be generated in a certain period of time so that the client may utilize the model as part of an important time-sensitive task (e.g., traffic detection in new highways and roadways that is necessary to prevent gridlock). In these cases, a model generation service may be required to stop training the machine learning model after a certain period of time—often when the model has not been optimized it will not produce highly-accurate results. In some cases, the cloud-services provider may offer model generation as part of a commercial service and producing inaccurate machine learning models is not acceptable to clients. In some cases, clients that do not have access to optimal hardware and time resources offered by the cloud-services provider (e.g., those subscribing to lower cost services) may also receive models which were not fully trained to optimal levels because the hardware used to train the model was not highly-optimized and expensive (e.g., graphical processing units, or GPUs). Thus, the cloud-services provider is at a disadvantage when attempting to train models in a shorter period of time or when using less optimal hardware to train the machine learning models. This also affects the experience of the client.

BRIEF SUMMARY

Aspects of the present disclosure include techniques for dynamic time-based custom model generation. Specifically, a machine learning model may be generated and trained optimally within a predetermined time period and/or using a predetermined set of resources. A client or other entity may provide a training dataset for training a machine learning model as well as model generation constraints relating to rules on the generation and training of a model. For example, a model generation parameter may provide that a machine learning model should be trained in a time period no greater than one hour. Given the training dataset and the model generation constraints, a model training process is executed which will optimize model generation and training adhering to the constraints specified by the client. For example, a model is generated and trained according to a selected set of hyperparameters using a modified training dataset, each of which is optimized for training within a period of one hour.

An example method comprises receiving, by a computing device, training data, the training data comprising one or more training datasets and an indication of a first time period; determining, by the computing device and based at least in part on the training data, a modified training dataset and one or more hyperparameter values for a machine learning model; determining, by the computing device and based at least in part on the modified training dataset and the first time period, one or more training iterations, each training iteration of the one or more training iterations corresponding to a second time period and the one or more training iterations corresponding to a total time period that is less than or equal to the first time period; for each training iteration in the one or more training iterations, training, by the computing device, the machine learning model using the one or more hyperparameter values and the modified training dataset; and outputting, by a computing device, the trained machine learning model.

In some examples, the training data is received from a client device communicatively coupled to the computing device and the computing device outputs the trained machine learning model to the client device in response to receiving the training data.

In some examples, the trained machine learning model is a convolutional neural network machine learning model configured to receive input data including one or more digital images and output, based at least in part on the input data, one or more predictions associated with the one or more digital images, the one or more training datasets comprise one or more first digital images, and the modified training dataset comprises one or more second digital images that are a subset of the one or more first digital images.

In some examples, determining the modified training dataset comprises determining, by the computing device, a subset of the one or more training datasets based at least in part on one or more features of the training data and generating the modified training dataset including the subset of the one or more training datasets.

In some examples, determining the one or more hyperparameter values for the machine learning model comprises: determining, by the computing device and based at least in part on the modified training dataset and the machine learning model a set of hyperparameters for training the machine learning model, selecting, by the computing device and based at least in part on the first time period, a subset of hyperparameters of the set of hyperparameters, and generating, by the computing device and using a mutating genetic algorithm and during a second time period that is less than the first time period, a set of one or more values for the subset of hyperparameters.

In some examples, determining the one or more training iterations comprises: performing, by the computing device, an initial training of the machine learning model using the one or more hyperparameter values and the modified training dataset, determining, by the computing device, an initial time period corresponding to the initial training, and determining, by the computing device, a number of initial time periods that, in summation, are less than or equal time to the first time period.

In some examples, the modified training dataset includes a plurality of data objects that are input to the machine learning model to cause training the machine learning model, and each training iteration of the one or more training iterations is performed using the modified training dataset including the plurality of data objects in a unique sequence.

In some examples, the computing device comprises a processing infrastructure of a processing type, and determining the modified training dataset, the one or more hyperparameter values, and the one or more training iterations is further based at least in part in part on the processing type of the computing device.

In some examples, the example method further comprises comparing, by the computing device, a number of data objects in the one or more training datasets to an object threshold, and determining, by the computing device, that the number of data objects in the one or more training datasets exceeds the object threshold, wherein determining the modified training dataset comprises including a number of data objects from the one or more training datasets in the modified training dataset that is less than or equal to the object threshold.

In some examples, the example method further comprises generating, by the computing device and using the one or more training datasets, one or more testing metrics for the trained machine learning model, and outputting the one or more testing metrics.

Another aspect of the present disclosure comprises a system comprising one or more processors and a non-transitory computer-readable media that includes instructions that when executed by the one or more processors, cause the one or more processors to perform the methods described above.

Another aspect of the present disclosure comprises a non-transitory computer-readable media that includes instructions that when executed by one or more processors, cause the one or more processors to perform the methods described above.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
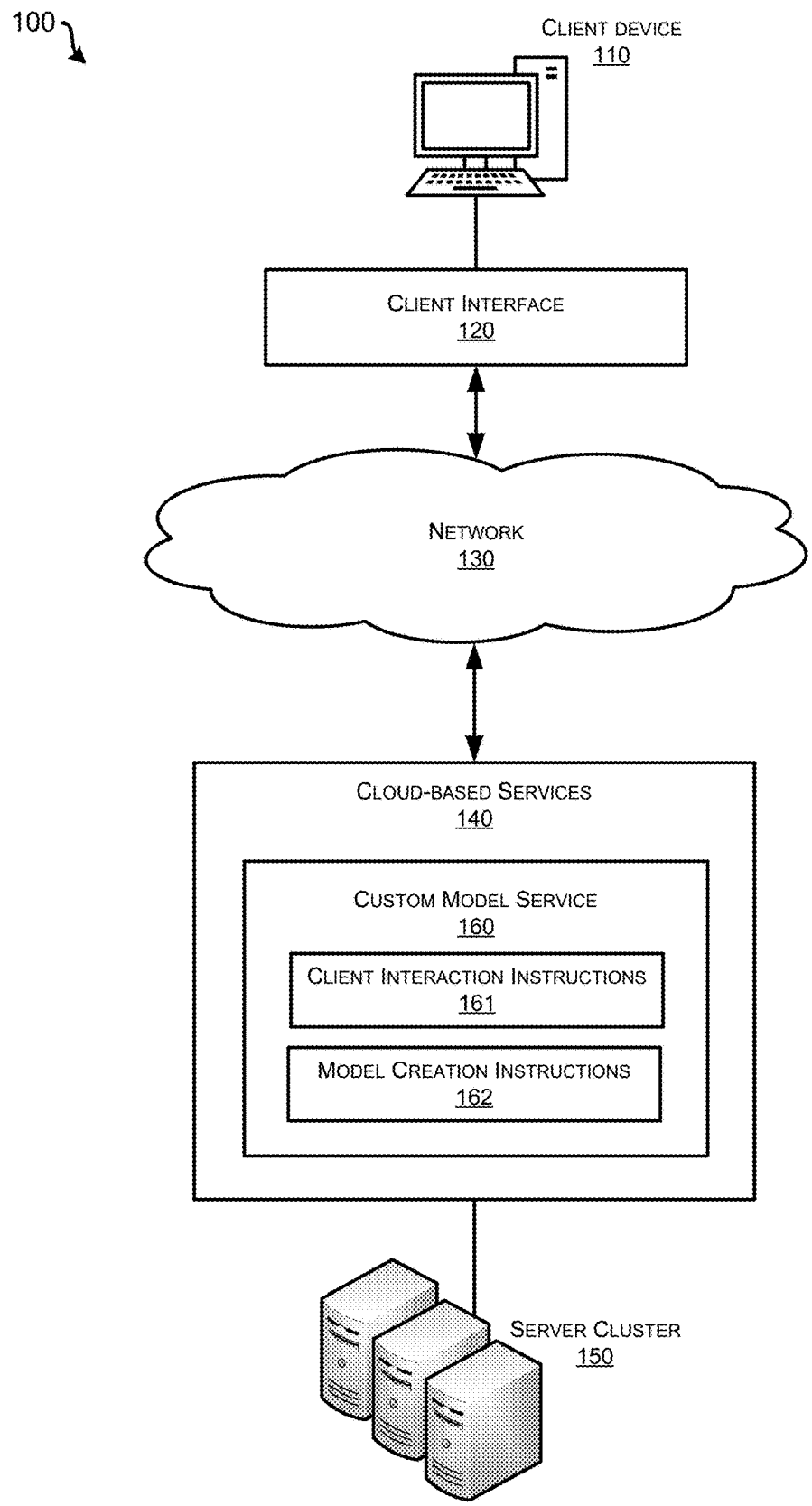
FIG. 1 is a block diagram of a distributed infrastructure-as-a service system for facilitating a cloud-based service accessible to a client according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive.

A cloud-services provider may offer services that a client (also referred to herein as "users," "customers," and "subscribers") can subscribe to. Cloud-based computing services allow the client to utilize cloud-based resources owned and operated by the service provider for the client's own services and applications, for example generation of a machine learning model using a training dataset. The client may provide the training dataset to the cloud-services provider with the expectation that the cloud-services provider will generate and train a machine learning model using the training data that will be sent back to the client. The client will then use the trained machine learning model to input some data in a similar format to the training data (e.g. digital image data) to generate an output prediction (e.g., a set of labels for the input digital image data corresponding to predictions of objects detected in the digital images).

As described above, model training is not deterministic and model optimization is a continuous process, and adding time constraints to the training of a model will often cause the training to be cut off when the model has not been optimized. Because hyperparameter tuning for a machine learning model and training the model using the hyperparameters is a time and resource intensive process, cutting off training for a model often occurs long before the model has been properly optimized. Thus, when a client specifies some constraint on the generation and training of a model, the client will often receive a model that is not properly trained and optimized. The probability of a sufficiently accurate model being generated increase as training time increases, but a cut-off often preempts the model from reaching this state.

In various embodiments described herein, techniques for dynamic time-based custom model are utilized to generate and train a machine learning model in a manner optimized for a time-based constraint. Specifically, a client may send, to a cloud-services provider, a training dataset and an indication of a time-based constraint corresponding to a time period at which a trained machine learning model will be returned to the client. For example, a client may specify that a cloud-service for generating a trained machine learning model should generate a sufficient machine learning model (e.g, a machine learning model that will generate predictions with a sufficient level of accuracy and/or recall) within a particular time period, such as one hour. In another example, a client may directly or indirectly send an indication of computing resources to the cloud service, and the indication of computing resources will be used to determine a time period (e.g., a customer pays for a subscription utilizing up to 20 gigabytes (GB) of computing resources for generating a machine learning model using hardware that operates at 5 megabytes (MB) per second, meaning the model generation shall only be trained for up to a little over one hour (20,000 MB÷5 MB/s÷60 min/s=~66 min). In another example, the client might want a low compute model that has very fast inference so that it is deployable on the edge or conversely the client might want a more complex model that has very high accuracy without any deployment constraint.

Once the training dataset is received from the customer and the time constraint for training the machine learning model is determined, techniques for dynamic time-based custom model generation are utilized to generate and train an optimized machine learning model within the time constraint. The generation of the model consists of steps of preprocessing the machine learning model to optimize the model's format and then training the machine learning model in the remaining time. The preprocessing step to optimize the model's format consists of several steps which will prepare the model for optimized training in the training step, including dynamic determination of a set of hyperparameters that will dictate the manner in which the machine learning model is trained. The training will then occur based on the dynamically determined set of hyperparameters.

The techniques for dynamic time-based custom model generation described herein may utilize a number of steps in sequence and/or in combination. As an initial step, a client may provide training data to a cloud-based service configured to generate and train a machine learning model according to a time-constraint. The trained machine learning model will be output to the client that provided the original training data. The training data may include any factors that are necessary to train the machine learning model and may include other information. Examples of data objects in the training data include the training dataset that will be used to train the model, an indication of a time constraint during which the model must be trained and generated, in embodiments where the training data includes a number of "ground-truth" labels, the number of possible classes in the ground-truth labels, a type or goal of training the model (e.g., training for accuracy versus speed of output), etc.

All of the training data supplied by the client is utilized by the cloud service to preprocess the data, generate the machine learning model, and train the machine learning model in a manner optimized for the time constraint. In some embodiments, preprocessing the training data includes generating a subsampling of the training datasets provided by the customer. The subsampling may be utilized to decrease the size of the training dataset for optimal training within the time constraint. For example, a client may provide thousands of training datasets for training a machine learning model. However, a time constraint may limit the number of training datasets that may be used to train the machine learning model, and the training datasets may be reduced to a collection of hundreds training datasets. The subsampling of the training datasets may be based on the data supplied by the client, for example, a number and size of training datasets, the number of classes present in ground-truth labels, etc.

Additional preprocessing of the training data supplied by the client may be specific to the type of machine learning model being trained by the cloud service. For example, a client may specify that a convolutional neural network (CNN) is to be generated and trained using a training dataset of digital images supplied by the client. The digital images will correspond to various "ground-truth" labels corresponding to true labels of objects depicted in the digital images. One method for optimization of CNN machine learning models is anchor optimization, wherein a set of "anchor" bounding boxes are determined for the digital images in the training dataset. For example, given a training dataset of digital images and a set of ground-truth labels specifying that the digital images contain the label "car," the cloud-service may perform anchor optimization of bounding boxes corresponding to known or predicted shapes of automobiles across different image capture views to improve image processing by the CNN. An example of anchor optimization can be found in the paper "Anchor Box Optimization for Object Detection" citation: Zhong, Y., Wang, J., Peng, J., & Zhang, L. (2020). Anchor box optimization for object detection. In *Proceedings of the IEEE/CVF Winter Conference on Applications of Computer Vision* (pp. 1286-1294). This approach can additionally be extended by enabling random subsampling for estimation of the anchors. The references noted above are incorporated by reference herein, in their entirety.

Other types of preprocessing for various types of machine learning models include augmentation, wherein input images are adjusted to provide variations of the digital image data for a CNN which enables robustness of the model to different variations in the input images. For example, a filter or color mask may be applied to a digital image, which causes the CNN to more easily recognize different ranges of pixel values in a digital image. In various embodiments, the cloud service preprocessing involves class-specific image augmentation, wherein the cloud service will automatically detect a class of a client provided image and determine a type of augmentation to apply to the image. In many instances, other types of preprocessing will transform the training datasets into corresponding data types which are more easily processed for downstream operations, such as dynamic hyperparameter tuning.

Once preprocessing of the training data has concluded, the machine learning model is generated. As described herein, a machine learning model typically employs one or more hyperparameters specifying the manner in which the machine learning model will be trained. Examples of hyperparameters include learning rate, momentum, weight decay, and many others. Hyperparameter tuning is often utilized to optimize hyperparameters for training a machine learning model using a specific training dataset. In various embodiments, the tuning of the hyperparameters of the machine learning model is performed according to the time constraint specified by the client and in accordance with the newly subsampled training dataset. In various embodiments, a subsampling of hyperparameters is also determined and the subsampling of hyperparameters are subjected to tuning processes while other hyperparameters are held constant or removed from the model.

In various embodiments, the hyperparameters are generated based on a learning adaptive algorithm e.g. a mutating genetic annealing algorithm for hyperparameter tuning and selection. In the pre-processing step, a set of all hyperparameters to be optimized over is obtained. The average contributions of each hyperparameter is quantified using any suitable hyperparameter attribution method such as sensitivity analysis (e.g. Invalid source specified.). A ranking of the weighted contributions of each hyperparameter is obtained.

A mutating genetic algorithm will start with a set of default hyperparameter values and then tune the hyperparameters values according to the steps below:

Pre-Processing
1. Determine set of all hyperparameters with significant contributions to the model performance.
2. Estimate and rank the contribution of each and different possible clustering of these hyperparameters based on a robust dataset.
3. Estimate the time taken to conduct hyperparameter optimization on different subsets of hyperparameters on datasets of different sizes.

Hyperparameter Optimization
(1) Define the genetic algorithm objective, "fitness function", as the accuracy metric of the model.
(2) Define subset of hyperparameters to be optimized based on the time estimated as discussed in the pre-processing steps above.
(3) Define a performance threshold whereby the genetic algorithm is stopped or identified as converged.
(4) Initiate the genetic algorithm with some values for its initial hyperparameters where the chromosomes correspond to the specific hyperparameters, the genes correspond to the values these hyperparameters are initiated at and the population as the search space of all possible values.
(5) Conduct a genetic algorithm as discussed here: Srinivas, M., & Patnaik, L. M. (1994). Adaptive probabilities of crossover and mutation in genetic algorithms. *IEEE Transactions on Systems, Man, and Cybernetics,* 24(4), 656-667 or here: Mitchell, M. (1998). An introduction to genetic algorithms. MIT press.
   a. A genetic algorithm emulates the natural evolution process with iterative random maximization of the species characteristics.
   b. A genetic algorithm consists of the following:
      i. Generations: The number of iterative steps the characteristic of the specie is evolved over.
      ii. Mutation: In each generation, a small percent of the genes is randomly mutated to enable diversity and exploration in the solutions.
         1. The percentage of mutations can be adapted to be higher in the beginning of the search process and progressively lower in the search process in a progress known as annealing.
      iii. The fitness function (deep learning model accuracy metric) is used in a 'Selection' process to determine the candidates of the current generation that would be used in building the next generation.
         1. Depending on the custom model, the accuracy metric is a weighted sum of different metrics e.g. for object detection, this can be the localization metrics at different intersection-over-union threshold and classification metrics at different confidence levels.
      iv. The combination of mutation and selection ensures that not just the fittest members of the population are used in creating the next population but that it includes some diversity as well to avoid local (non-global and robust) solutions.
      v. Crossover: This is the process whereby the genetic information of two parents' chromosomes is combined to generate a new offspring.
      vi. The above process is repeated until a pre-specified optimization goal is met e.g. the change in the fitness function is below the convergence threshold set after a number of generations or prespecified to stop after a number of generations.
(6) The number of generations, size of the convergence threshold, number of hyperparameters, the range of values of each hyperparameter, the number of grids the range is divided into, the number of epochs the model is expected to run to evaluate the fitness function etc. are all variables that are adaptively adjusted based on the time constraint specified.

Example publicly available code of base genetic algorithm is here (https://github.com/ultralytics/yolov5/blob/6a3ee7cf03efb17bffde0e68b1a854e80fe3213/train.py#L608). This may not be adaptive or variably adjusted based on the time constraint.

The techniques for dynamic time-based custom model generation described herein may utilized a modified genetic algorithm for tuning of a subset of possible hyperparameters according to the subsampled training dataset. During the preprocessing steps above, the subsampling of training data may be processed to determine one or inputs for a modified genetic algorithm to determine one or more hyperparameters values for a generated machine learning model. For example, the time constraint may be processed to generate an input for the modified genetic algorithm that will ensure that the modified genetic algorithm will continue for a specified period of time proportional to the time constraint. In another example, the training dataset is processed to determine the number of training data objects in the training dataset. The number of objects may be used to determine the number of hyperparameters or the range of the values of the hyperparameters search over or an initial hyperparameter value to be input to the modified genetic algorithm (e.g. a learning rate that may be increased or decrease based on the size and variance of the training dataset), based on the entire dataset or a subsampling of the data. In various embodiments, the modified genetic algorithm includes one or more performance metrics relating to optimal training conditions for training the machine learning model during a time constraint. For example, the one or more performance metrics may relate to an optimal hyperparameter configuration for training the model in a specified period of time, versus optimal hyperparameter configuration for training a model in a non-deterministic period of time.

The modified genetic algorithm may continue to tune hyperparameters for the machine learning model until a condition is met, for example a specified tuning time period expires, a default maximum time period for tuning expires, or the hyperparameters attain a certain characteristic (e.g., a rate of training retention) sufficient to train the machine learning model. The tuned hyperparameters will then be used to generate a trainable machine learning model that will be trained and output to the client in subsequent steps.

Once the machine learning model is generated including the dynamic custom tuned model hyperparameters which is tuned on a subsample of the data, the training dataset may be used to train the machine learning model during the remaining time period in the time constraint with the hyperparameters values learnt. Training may consist of input of training data objects from the training dataset to the machine learning model to generate a predicted output label in a format similar to the ground-truth labels of the training dataset. The differences between the predicted output of the machine learning model and the ground truth label are used to refine the operating parameters of the machine learning model according to rates and configurations specified in the tuned hyperparameters.

Training the machine learning model is performed in a series of iterations in which the entire subsampled training dataset is input to the machine learning model until every training data object has been input to the machine learning model. Each iteration is performed in a certain amount of time, which will be referred to herein as a training "epoch." The goal of the techniques for dynamic time-based custom model generation will be to perform as many training epochs in the training time constrained period as possible.

Determination of the time taken for each training epoch may be performed experimentally following the generation of untrained machine learning model. For example, because each training data object in the subsampling of training data may include different data, different classes of labels, and different numbers of labels associated with the item, a training epoch is highly variable. In some embodiments, the initial input of the training dataset to the machine learning model is a pre-training epoch, during which the machine learning model will not "learn," and which is performed purely to measure the training epoch for calculating the number of epochs to perform during the remaining time period.

Once the number of remaining training epochs is determined, by example by dividing the remaining time in the time constrained period by the total time during the first experimental epoch, the remaining training epochs are performed to train the machine learning model. In various embodiments, each training data object in the training dataset in input to the machine learning model in a particular order during each separate epoch. For example, the introduce variability into the training phase, each sequence of training data objects in the training dataset is randomly generated so that the machine learning model does not experience training bias.

Once the machine learning model has been trained sufficiently or the time constraint period elapses, the trained machine learning model is output, for example to the original requested client. In some embodiments, a number of incidental or downstream actions are possible once the model has been trained. In some embodiments, the trained machine learning model is tested using the training dataset to determine metrics such as the precision and/or recall of the machine learning model. In some embodiments, the client may be prompted whether the model should be retrained or further trained (e.g. using a new subsampling of the training dataset).

In one non-representative example of the techniques for dynamic time-based custom model generation described herein, a client sends, to a cloud service configured for custom model generation, training data including a training dataset with various digital photographs of cars and a time constraint of one hour to train the model using the training dataset. The client also specified that the model to be created is a CNN machine learning model, which the client would like to identify cars in digital images once trained. The cloud service processes the training dataset, determines a subset of the training dataset which is used for hyperparameter optimization, and subsamples the training dataset to generate a modified training dataset. The cloud service then processes the training dataset and performs anchor optimization of bounding boxes according to ground-truth labels of cars found in the modified training dataset.

The cloud service will further use the custom specified time constraint and the modified training dataset to generate input parameters to a modified mutating genetic algorithm for hyperparameter optimization. The generated input parameters may specify, for example, the rate at which the genetic algorithm will mutate and set a secondary time constraint for tuning of the hyperparameters, for example, 2 minutes. The generated hyperparameters are tuned to train a machine learning model in the remaining 58 minutes of the client-specified time constraint in an optimized manner. The hyperparameters are included in an untrained CNN machine learning model and the modified training data is compiled in a format that will be input to the CNN. An initial experimental training epoch is performed using modified training dataset to determine the time period of the epoch, which takes 3 minutes. The cloud service determines that 55 minutes remain in the time constraint, and with each epoch taking 3 minutes to train, 18 additional training epochs should be performed (leaving one minute in the time constraint, as a $19^{th}$ epoch would exceed the client-specified hour for training).

The additional 18 training epochs are performed by randomly sequencing the training data objects in the modified training dataset prior to each epoch and training the machine learning model based on differences between prediction outputs and the ground truth values according to the hyper parameters. The resulting trained machine learning model is an optimized trained machine learning model that may be output to the client for use in identifying cars from an input dataset. In some embodiments, the remaining 1 minute of time may be utilized to test the CNN using training data objects not included in the modified training dataset to compile accuracy and recall statistics to present to the client.

Example Cloud-Based Service Environment

FIG. 1 is a block diagram of a distributed infrastructure-as-a service system for facilitating a cloud-based service accessible to a client according to certain embodiments of the present disclosure. The system 100 depicted in FIG. 1 comprises systems and devices connected directly or indirectly to a network 130 to form a cloud-based infrastructure. Network 130 may be any communicative entity or medium through which data may be transmitted. For example, network 130 may be an internet, intranet, cloud-based network, local area network, hard-line connection, wireless signal, virtual network, or other medium for networked communication between devices. Various networks that may be used will be recognized by one having ordinary skill in the art, and several are also discussed below.

Network 130 may be communicatively coupled to client interface 120. Client interface 120 may be an interface or other software-based service configured to connect a client device to a network, such as network 130. For example, as depicted in FIG. 1, client interface 120 is implemented by client device 110. Client device 110 may be any type of device operating in any format necessary to perform the embodiment described herein, and the number of client devices that may comprise an embodiment is not limited. In various embodiments, a client device 110 is a device operable by a client and/or customer to request, generate, display, and/or interact with a client interface 120. For example, a client may initiate software programming instructions to execute an instance of client interface 120 using processing hardware in client device 110.

Client interface 120 may be a software-based instance of a graphical user interface (GUI) to be implemented as part of the embodiments described herein. For example, a client may utilize the client device 110 to operate client interface 120 to communicate with network 130 and therefore other components of system 100. In various embodiments, client interface 120 establishes a connection with network 130 to facilitate the embodiments described herein. An example of a client interface is given with respect to FIGS. 6 and 7 below.

Network 130 may be further communicatively coupled to cloud-based services 140. Cloud-based services 140 may be a cloud-based software service implemented across multiple directly or indirectly linked hardware devices. For example, as depicted in FIG. 1, cloud-based services 140 is implemented by server cluster 150. Server cluster 150 may be any type of server device operating in any format necessary to perform the embodiment described herein, and the number of server devices that may comprise a cluster is not limited. In various embodiments, a server cluster 150 is a grouping of device operable by a service provider and/or administrator to store, send, receive, render, generate, and manage generated data relating to a cloud-based services 140.

Server cluster 150 may implement cloud-based services 140 as a cloud-based program, application, or set of instructions executing on one or more server devices of server cluster 150. Cloud-based services 140 may be a set of services available to a client, such as a client user of client device 110 implementing client interface 120, and accessible through network 130. For example, as described herein cloud-based services 140 may include a cloud-storage and processing service available to a client in a subscription-based format through which a user may store data in a cloud-storage environment. Specifically, a client using client device 110 may send, using client interface 120, data to cloud-based services 140 through network 130. The data may be physically stored at local server devices of server cluster 150 and made available to a client or other entities through a web portal made available on network 130.

As depicted in FIG. 1, cloud-based services 140 includes a custom model service 160 which is a cloud-based service for generating and training a machine learning model according to the embodiments described herein. In order to facilitate interactions with client device 110 through client interface 120 via network 130, customer model service 160 includes client interaction instructions 161. For example, client interactions instructions 161 may be a set of instructions executable by custom model service 160 in order to receive training data from a client and output a trained model to the client in response to receiving the training data. Instructions for generation and training of the machine learning model may be included in custom model service 160 as executable model creation instructions 162.

Figure 2:
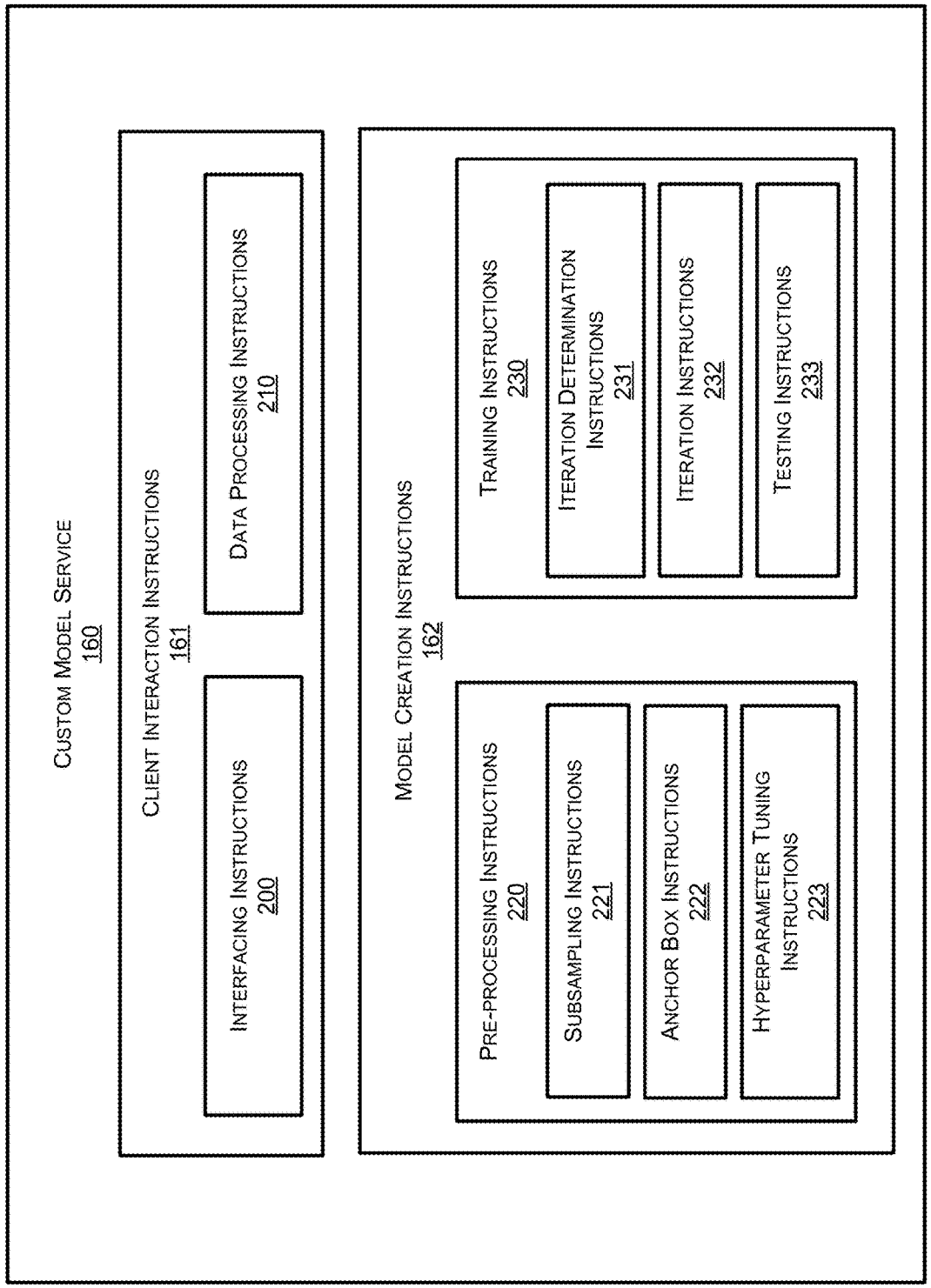
FIG. 2 is a block diagram of an example custom model service accessible as part of a cloud-based service according to certain embodiments of the present disclosure.

FIG. 2 is a block diagram of an example custom model service accessible as part of a cloud-based service according to certain embodiments of the present disclosure. Specifically, FIG. 2 depicts custom model service 160 and various components therein which facilitate the model generation and training embodiments described herein. As described above, custom model service 160 includes client interaction instructions 161, which are instructions for interacting with a client, such as a human entity operating client device 110 via client interface 120. Client interaction instructions include interfacing instructions 200. Interfacing instructions 200 may include instructions configured to receive, generate, or otherwise utilize internet based communications between custom model service 160 and a client. For example, interfacing instructions 200 may include instructions indicating communication formats and protocols through which data may be exchanged between custom model service 160 and a client via a network 130.

Client interaction instructions 161 further include data processing instructions 210, which may be instructions configured to cause processing of data received from the client. For example, a client may send, to custom model service 160, a package of training data including data specifications for generating and training a machine learning model. For example, a client may utilize client interface 120 to package a set of training data including training datasets, time constraints, and other specifications for generating and training a model. Data processing instructions 210 may be configured to include instructions for processing the training data received from a client to determine how the data will be routed, including to model creation instructions 162.

As described above, model creation instructions 162 may be instructions for generating and training a machine learning model according to training data received from a client as part of custom model service 160. Model creation instructions 162 may further include sub-instructions for generating the machine learning model and training the machine learning model. For example, model creation instructions 162 includes preprocessing instructions 220. Pre-processing instructions may be instructions for utilizing and manipulating training data that will be used to create a machine learning model in order to generate a time-optimized machine learning model.

As depicted in FIG. 2, pre-processing instructions 220 include subsampling instructions 221. Subsampling instructions 221 may be any instructions which are configured to cause subsampling of a training dataset from a client to be performed as part of the creation of the time-optimized machine learning model. In some embodiments, subsampling instructions 221 include instructions relating to calculation of threshold amounts of training dataset that are allowed in a training epoch. For example, instructions in subsampling instructions 221 may specify that a certain range of sizes that may be contained in a training dataset that will be used to train a machine learning model. If the training dataset received it too small, the model will not learn sufficiently, and the subsampling instructions 221 may cause the model creation process to terminate or query the client for additional training datasets. If the training dataset received is too big (e.g., a set of predetermined rules specifies that a training epoch using the full training dataset would be too large for the client-specified time constraint), subsampling instructions 221 may cause sub sampling to be performed to generate a new modified dataset. Subsampling may be configured to generate modified distributed training datasets according to aspects of the training dataset received. For example, the subsampled training dataset generated according to subsampling instructions 220 may include an equal or relative proportion of training data objects corresponding to each class of ground-truth label in the training dataset.

Anchor box instructions 222 are instructions relating to anchor box optimizations when the model created will be an image processing model, such as a CNN. In this case, anchor box instructions 222 may be configured to perform anchor optimization on the CNN prior to training the machine learning model. For example, one or more hyperparameters relating to object-based bounding boxes the aid in the detection of regions of interest in a digital image may be determined using anchor optimization and the one or more hyperparameters may be included in the eventual CNN machine learning model that is generated to be trained. In various embodiments, custom model service 160 stores a number of pre-generated anchor bounding boxes related to various classes for ground-truth labels. For example, the service may store a rectangular bounding box related to automobile shapes as presented in a digital image. These predetermined anchor boxes may be used to refine the manner in which a CNN machine learning model will attempt to prediction instances of entities in the digital images.

Pre-processing instructions 220 includes hyperparameter tuning instructions 223, which may be instructions executable to generate a set of tuned hyperparameters for a machine learning model within a deterministic period of time. In various embodiments, an algorithm, such as a mutating genetic algorithm will receive pre-processed inputs relating to factors for hyperparameter tuning, such as a maximum period of time for tuning the hyperparameters. Hyperparameter tuning instructions 223 may then cause the generation of, tuning, and output of hyperparameters for inclusion in a machine learning model that will be trained using training instructions 230. More details regarding the hyperparameter tuning process with be discussed below with reference to FIG. 4.

Model creation instructions 162 also include training instructions 230 which are instructions configured to cause training of a generated untrained machine learning model, for example a machine learning model generated as a result of pre-processing instructions 220. Training instructions include iteration determination instructions 231. Iteration determination instructions 231 may be instructions configured such that when the instructions are executed, they will cause the determination of one training "epoch" using the hyperparameters of the machine learning model and a training dataset. Iteration determination instructions 231 may also cause determination of a number of training epochs that will be possible within a time constrained period based on a given time constraint and a single experimental epoch execution. Training instructions 230 also include iteration instructions 232, which may be instructions configured such that execution of the instructions will cause further training of a machine learning model using a number of iterative training epochs until a time constrained period has elapsed. More details regarding epoch determination and training are given below, with reference to FIG. 6.

Training instructions 230 includes testing instructions 233, which may be a set of instructions configured such that when they are executed, will cause testing of a trained machine learning model. Testing of a trained machine learning model will occur, for example, but inputting a training or testing dataset into the machine learning model as input to generate prediction outputs for the input data. The prediction outputs are compared to ground truths associated with the training dataset to determine a rate of accurate of the model's predictions. Thus, testing the newly trained machine learning model will generate valuable metric-based insight into the accuracy and recall of the machine learning model. To avoid situations involving over-fitting of the model, at least some of the datasets input for testing the machine learning model may be taken from a new source different than the modified training dataset used to trained the machine learning model, such as unsampled training datasets in a client's originally-sent training data.

Example Machine Learning Model Generation and Training Processes

Figure 3:
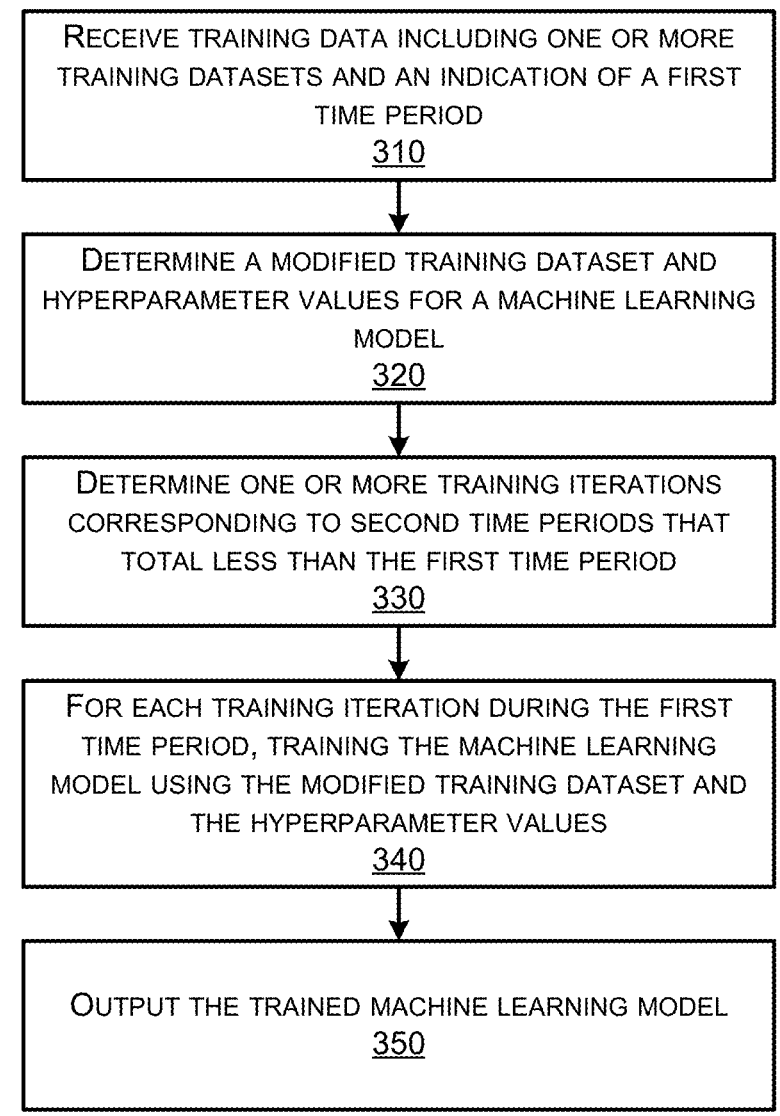
FIG. 3 depicts an example flowchart of a process for generating a trained custom machine learning model according to certain embodiments of the present disclosure.

FIG. 3 depicts an example flowchart of a process for generating a trained custom machine learning model according to certain embodiments of the present disclosure. Specifically, FIG. 3 depicts an example flowchart of a process 300 for generating and training a machine learning model in response to receiving training data from a client. Process 300 begins at 310 when training data is received including one or more training datasets and an indication of a first time period. For example, the training data may be received by a client utilizing a client interface 120 which compiles a set of training data, including one or more training datasets and an indication of a first time period that will be a time constrained period for creating a machine learning model. Other factors may also be received as part of the training data, for example, factors that will dictate the tuning of the hyperparameters and a set of processing hardware that training will be performed on. Examples of a user interface including these factors are discussed below with regard to FIG. 6.

At 320, a modified training dataset and hyperparameter values for a machine learning model are determined. Specifically, a cloud service such as custom model service 160 will intake the training data received in step 310 and determine a modified training dataset and hyperparameter values for the machine learning model. The modified training dataset may be generated using a subsampling process and the hyperparameters may be determined using a deterministic hyperparameter tuning process, both performed as part of a preprocess for training a machine learning model. The preprocessing steps, including the determination of the modified training dataset and the hyperparameter tuning are discussed below, with reference to FIG. 4.

At 330, one or more training iterations corresponding to second time periods that total less than the first time period are determined. As described herein, the first time period is a time-constrained period corresponding to a maximum time period for training a machine learning model. The one or more training iterations corresponding second time periods determined in 330 are iterations of training epochs, where each training epoch will take a set amount of time equivalent to the second time period. Thus, the total time for each of the second time periods in summation will be close to, but either less than or equal to the first time period, as training will not exceed the time-constrained period.

At 340, for each training iteration occurring during the first time period, the machine learning model is trained using the modified training dataset and the hyperparameter values determined in 320. Specifically, the machine learning model utilizing the hyperparameters determined in 320 will be iteratively trained over the one or more iterations until the last training iteration is complete. The modified training dataset determined in 320 will be used in each training iteration, though in some embodiments, the order of training data objects in the modified training dataset will change with each iteration. The training iteration determination and training periods will be discussed in more detail below, with respect to FIG. 5.

At 350, the now-trained machine learning model is output. The result of 340 concluding for all of the one or more training iterations will create a trained machine learning model within the first time period received in 310. The trained machine learning model may be output, for example, to a client that originally sent the training data received in 310. In some embodiments, the output trained machine learning model may be output to a testing subsystem for testing the machine learning model to determine one or more metrics regarding the machine learning model's performance. Examples of test-based results of a machine learning model are described in more detail below, with regard to FIG. 7.

Figure 4:
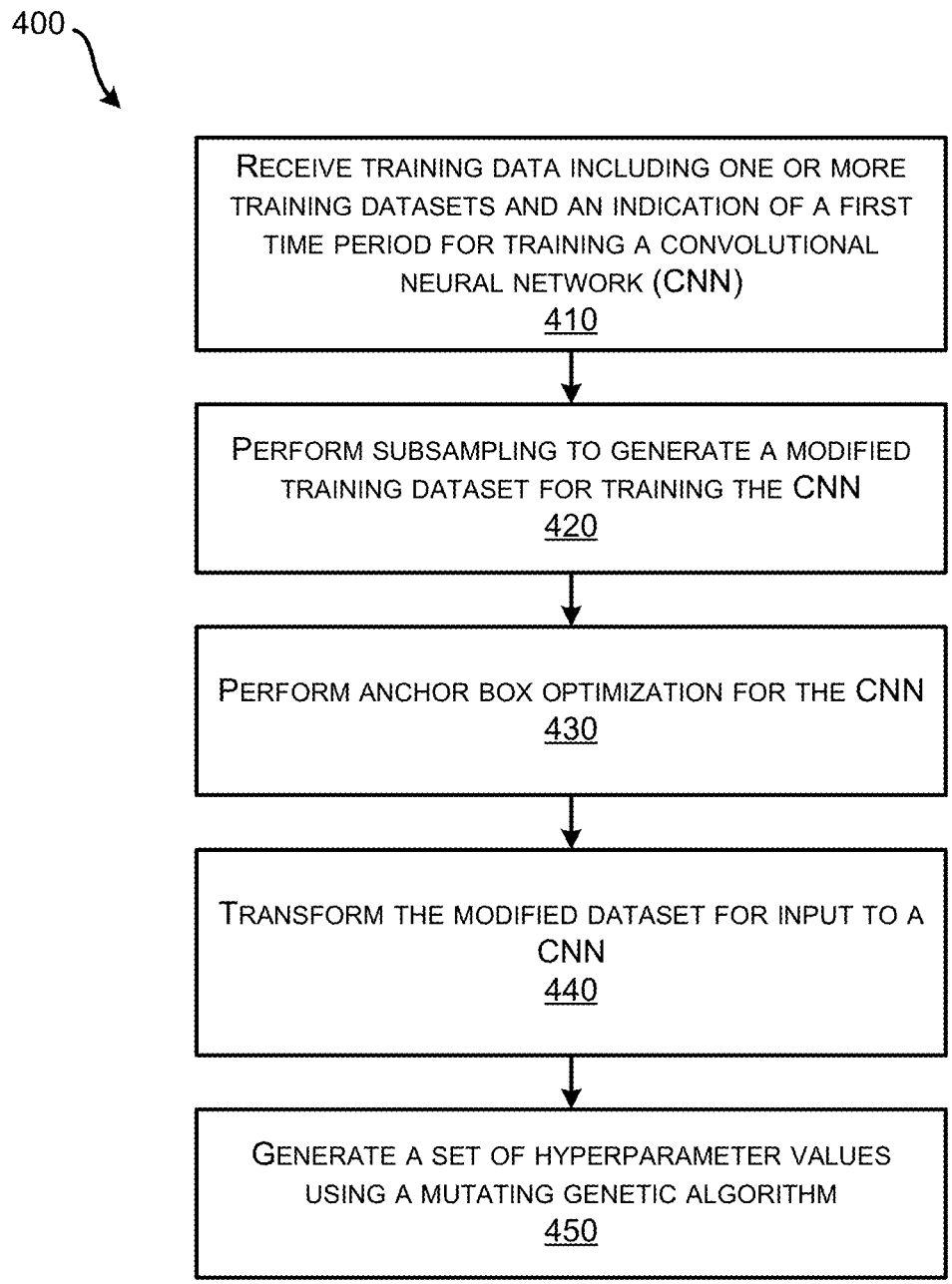
FIG. 4 depicts an example flowchart of a pre-process for generating a trained custom machine learning model according to certain embodiments of the present disclosure.

FIG. 4 depicts an example flowchart of a pre-process for generating a trained custom machine learning model according to certain embodiments of the present disclosure. Specifically, FIG. 4 depicts an example flowchart of a process 400 for pre-processing data received from a client including training data for training a machine learning model. The steps depicted in FIG. 4 relate to steps for model generation prior to training the machine learning model. In this example, a CNN machine learning model is discussed, though it will be appreciated that any machine learning model may be utilized as part of these steps with appropriate modification.

Process 400 begins at 410 when training data including one or more training datasets and an indication of a first time period for training a convolutional neural network (CNN) is received. Step 410 may be similar to step 310 of FIG. 3, in that a client may send the training data to a cloud service with the expectation that the training data will be used to train a machine learning model during a first time period. As shown in FIG. 4, the machine learning model to be created in a CNN, and the training dataset may then be, for example a set of digital images including entities depicted within the digital images, and a set of ground-truth labels corresponding to the digital images that will be used to train the machine learning model. The training data received in 410 thus includes training datasets, as least a subset of which will be used to train a CNN machine learning model within the client-specified first time period.

At 420, subsampling is performed to generate a modified training dataset for training the CNN. The subsampling may be performed based on factors included in the training data such as the first time period. For example, a full training dataset provided by a client is normally used in non-deterministic training processes where the time period for training the machine learning model in unbounded. The full training dataset will not always be used in dynamic time-based custom model generation, as the full training dataset would create an epoch that either would exceed the first time period, or would allow too few training epochs to be performed, reducing optimal model training procedures. Thus a subsampling of the client-provided training dataset is performed to generate a subset of the training dataset that will be used to train the machine learning model.

In various embodiments, the subsampling used to generate the modified training dataset accounts for aspects of the training dataset and related factors. For example, the subsampling may be configured to select an equitable distribution of ground-truth labels of certain classes from the training data and include the corresponding training data objects in the modified training dataset. For example, given a training dataset that includes ground truth labels for "automobiles," "traffic lights," "stop signs," and "lane markers" in equal proportions, the subsampling performed may also select training data objects (e.g., digital images associated with those ground truth labels) in an equal proportion. In various embodiments, the size of the modified training dataset is selected based on an epoch estimation or size considerations of the training data objects. For example, the cloud service may impose a range limit on the number of training data objects in the modified training dataset such that the training epoch will not be so long as to inefficiently limit the number of training epochs that may be performed.

At 430, anchor box optimization is performed for the CNN. As described above, anchor box optimization may be performed to provide a set of operating parameters and/or hyperparameters that will be utilized during training of the machine learning model. For example, given that a training dataset may include the same labels specified above, bounding box anchors for automobiles, traffic lights, stop signs, and lane markers may be retrieved from a memory of anchor bounding boxes and used to assist the model in recognizing those entities in the digital images included in the training dataset.

At 440, the modified dataset is transformed for input to the CNN. For example, a convolutional neural network may be configured to accept, as input, data "features" which will serve as the initial input values to the machine learning model. For example, a CNN may not accept a digital image in a standard viewable format as input for the machine learning model, but rather will accept a vectorized set of values corresponding to the digital images. The transformation will ensure that the digital image data will be acceptable as input to the machine learning model during training time and may also assist in hyperparameter tuning performed at 540.

At step 450, a set of hyperparameter values are generated using a mutating genetic algorithm. Specifically, a set of hyperparameters that will be utilized by the CNN machine learning model to train the model are generated and tuned in a deterministic manner. The generation of the set of hyperparameters may begin with a processing of the training data, the modified training dataset, the anchor box optimization results, and/or the modified training dataset referred to in other steps of process 400. For example, the training data indicates the first time period and may be used to derive a maximum time period during which the mutating genetic algorithm will be employed. The modified training dataset may be processed to determine aspects of the training data, such as color density, estimated average number of entities per training data object, number and type of classes associated with the training dataset, etc. These aspects may be used to determine initial values of the hyperparameters prior to execution of the mutating genetic algorithm or the manner of operation thereof.

In some embodiments, the processed data may indicate a subset of the hyperparameters that will be tuned using the mutating genetic algorithm. For example, given the first time period and the size of the modified training dataset, a subset of hyperparameters of a total set of hyperparameters may be selected as best candidates for tuning. Other unselected hyperparameters may be held static or tuned sparingly during the operation of the mutating genetic algorithm. The mutating genetic algorithm itself may be modified by the processed data. For example, the mutating genetic algorithm may receive, as operating inputs, a deterministic maximum time period for hyperparameter tuning and/or setting which determine the scale and frequency of random mutations to be performed. The result of process 400 will be a set of hyperparameter values that will be used by a CNN machine learning model to train the machine learning model in an optimal manner during the remaining duration of the first time period.

Figure 5:
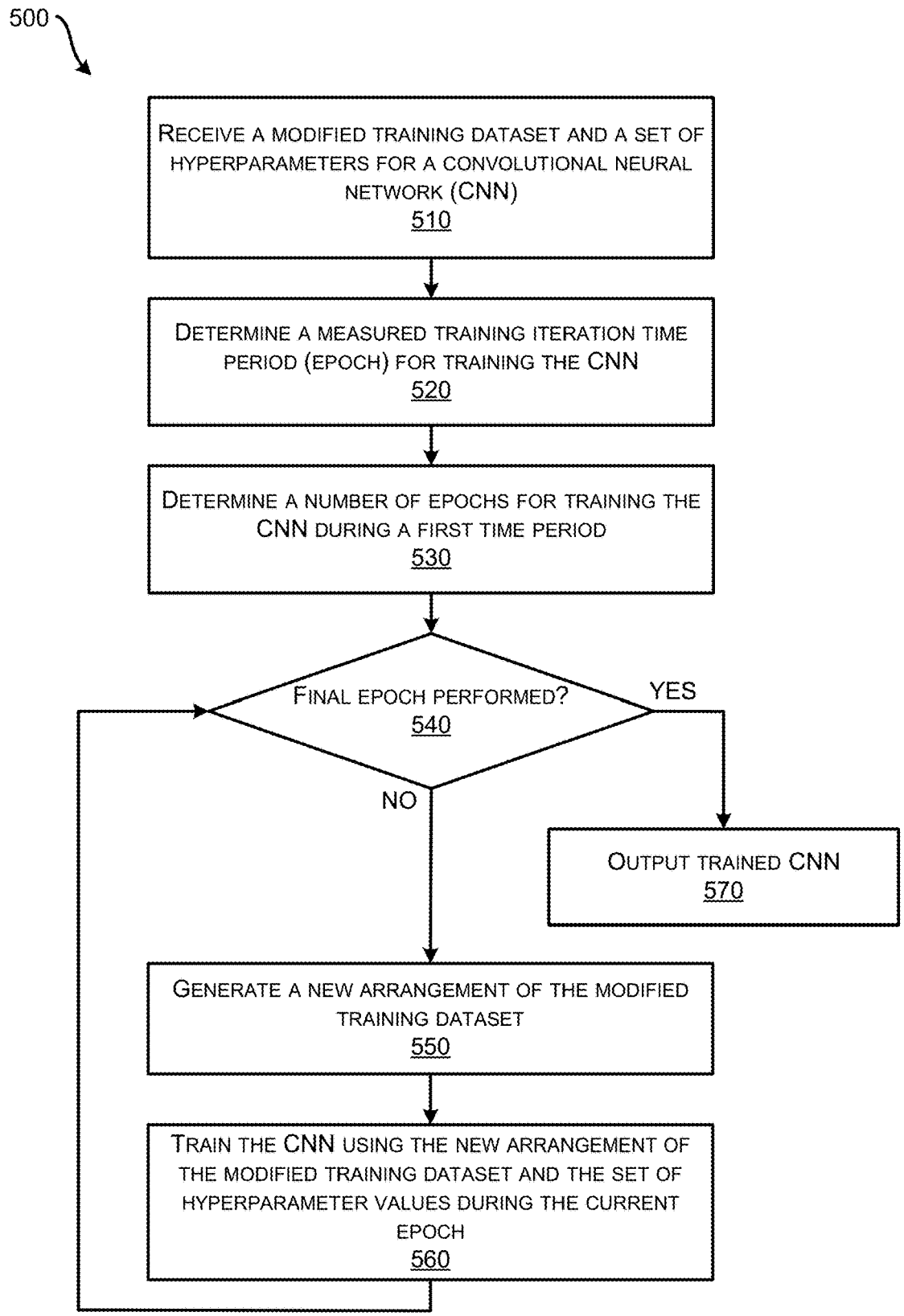
FIG. 5 depicts an example flowchart of a process for iteratively training a custom machine learning model over a time period according to certain embodiments of the present disclosure.

FIG. 5 depicts an example flowchart of a process for iteratively training a custom machine learning model over a time period according to certain embodiments of the present disclosure. Specifically, FIG. 5 depicts an example flowchart of a process 500 for training a CNN machine learning model using a modified training dataset and a set of tuned hyperparameters. In various embodiments, the training described with reference to FIG. 5 and process 500 may follow directly from the preprocessing described with reference to FIG. 4 and process 400. Process 500 begins at 510 when a modified training dataset and a set of hyperparameters for a convolutional neural network (CNN) are received. For example, the modified training dataset may be similar to a modified training dataset generated in 420 of process 400 and the set of hyperparameters may be similar to a set of hyperparameters generated in 450 of process 400. In various embodiments, in which an untrained CNN machine learning model has not been generated prior to 510, an untrained CNN machine learning model will be built including the set of hyperparameters.

At 520, a measured training iteration time period (epoch) for training the CNN is determined. Specifically, the modified training dataset received in 510 is input to the CNN machine learning model as part of a training step of the CNN machine learning model. The time between the input of the modified training dataset to the CNN machine learning model and the modification of the CNN machine learning model based on the prediction outputs therefrom may be recorded as the epoch time period. Thus, the epoch is measured as the time required to train the CNN machine learning model with the modified training dataset once. In some embodiments, the modified training dataset is input to the machine learning model, but the parameters of the machine learning model are held constant to prevent training while still allowing for the determination of the epoch time period.

At 530, a number of epochs for training the CNN during a first time period is determined. Specifically, using the measured time period determined in 520 and the remaining time in the first time period that has not elapsed (e.g. during preprocessing of the data and the steps performed in 520), a number of additional iterations of the training epoch that may be performed without exceeding the remainder of the first time period is calculated. For example, given that a training epoch as measured in 520 takes 3 minutes to complete, and given that 55 minutes remain in the first time period, the number of epochs to training will be given by the determination 55 min÷3 min/epoch=18.33≈18 epochs to run during the remained of the first time period. The determined number of epochs will be performed iteratively until the last epoch has concluded or the first time period elapses.

At 540, a determination is made as to whether the final epoch in the number of epochs has been performed. Specifically, a determination is made as to whether the training has completed because the last epoch has been performed (e.g., signifying that the first time period is nearly elapsed). If the final training epoch has not yet been performed (or if no training has yet occurred as process 500 has just proceeded from 530), the process 500 moves to 550 where a new arrangement of the modified training dataset is determined. As described herein, the modified training dataset is composed of training data objects (e.g. digital images for the CNN) and ground truth labels (e.g. one or more classes for a corresponding digital image). To ensure training during each epoch does not introduce bias into the model, the sequence in which the training data objects are input to the machine learning model may be rearranged.

At 560, the CNN is trained using the new arrangement of the modified training dataset and the set of hyperparameter values during the current epoch. Training will included methods for determining an objective function or difference values between the ground truth label and a predicted output of the machine learning model for a particular input training data object. The parameters of the CNN machine learning model are then modified to better predict output labels given a similar digital image as input. The training of all the training data objects in the new arrangement of the modified training dataset will signify the end of the current training epoch. The process 500 will then return to 540 to determine if the epoch just executed was the final training epoch out of the number of training epochs determined in 530. When the final epoch has been performed as determined in 540, process 500 then proceeds to 570, where the trained CNN is output. For example, the now trained CNN machine learning model can now be sent to a client that requested the model or subjected to additional testing.

Example Interfaces and Embodiments

Figure 6:
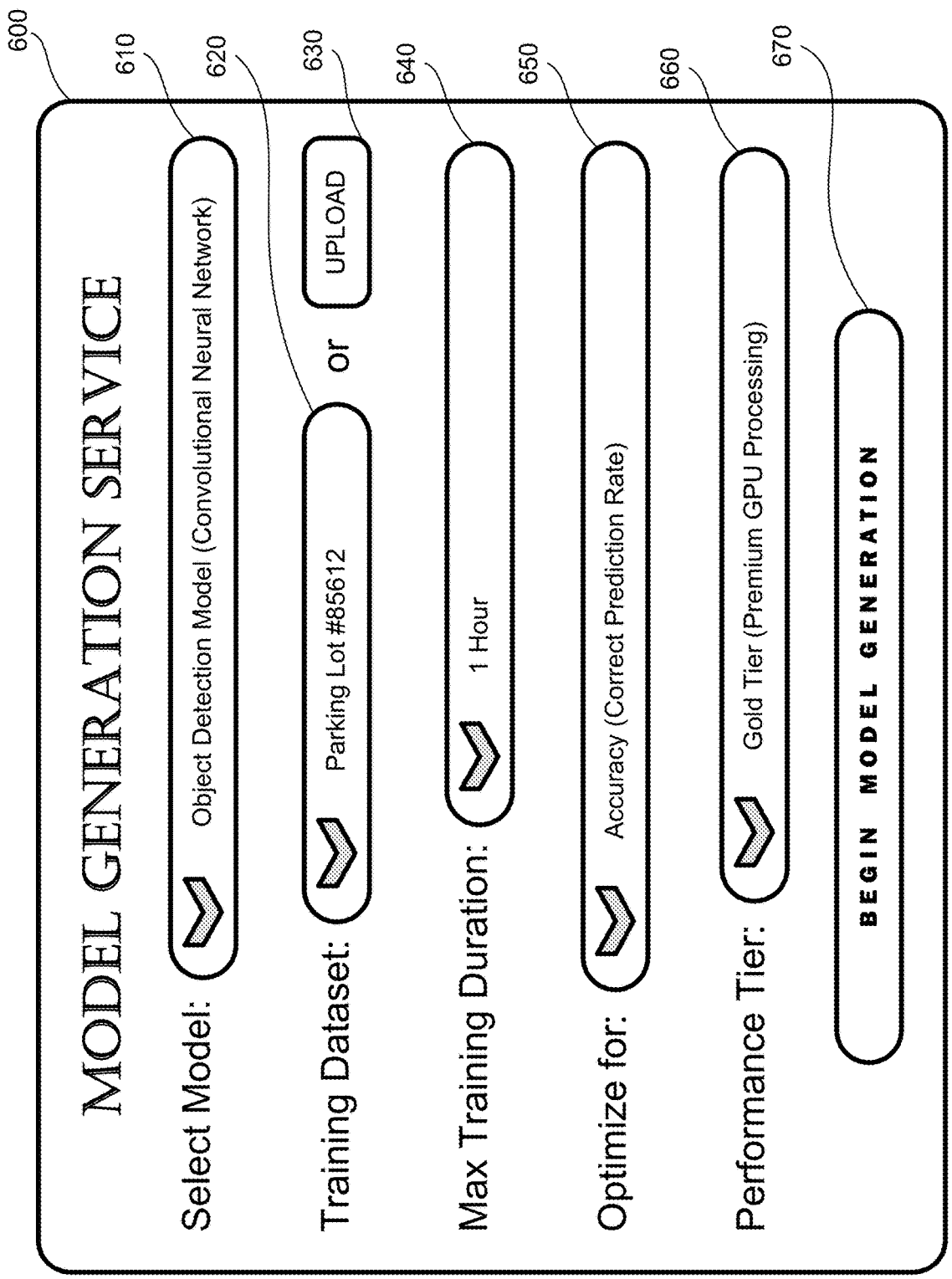
FIG. 6 depicts an example graphical interface and dashboard for requesting generating of a trained custom machine learning model according to certain embodiments of the present disclosure.

FIG. 6 depicts an example graphical interface and dashboard for requesting generating of a trained custom machine learning model according to certain embodiments of the present disclosure. Specifically, FIG. 6 depicts an example graphical user interface (GUI) that may be displayed by a client interface, such as client interface 120, to initiate a process for creating a machine learning model, such as process 300. As depicted in FIG. 6, interface 600 may be an interface including multiple elements that a client may use to interact with a cloud-based service, such as cloud-based services 140. Specifically, interface 600 is an example interface that includes a plurality of prompts and inputs that will be used to generate training data that will be used by a cloud service to create a machine learning model. For example, interface 600 include multiple input fields that a human client may utilize to generate training data that will be used to create a machine learning model.

Interface 600 includes model selector 610. Model selector 610 may be an interactive element that a client may use to specify a type of machine learning model that should be created for the client by the cloud service. For example, as depicted in FIG. 6, a field corresponding to the prompt "Select Model" is set to "Object Detection Model (Convolutional Neural Network)," specifying that the cloud service should generate a CNN machine learning model for the client.

Interface 600 includes training dataset selector 620 and input button 630. Training dataset selector 620 may be an interactive element that a client may use to specify a training dataset that should be used to train a machine learning model. For example, as depicted in FIG. 6, a field corresponding to the prompt "Training Dataset" is set to "Parking lot #85612," which may be, for example, a set of digital images of automobiles in a particular parking lot that have been labelled with ground truth data. In the alternative to selecting a premade training dataset from training dataset selector 620, a client may instead upload their own training dataset using input button 630.

Interface 600 includes time constraint selector 640. Time constraints selector 640 may be an interactive element that a client may use to specify a time constrained period over which a CNN machine learning model should be created for the client by the cloud service. For example, as depicted in FIG. 6, a field corresponding to the prompt "Max Training Duration" is set to "1 Hour," specifying that the cloud service should generate a CNN machine learning model for the client in no more than one hour.

Interface 600 includes optimization selector 650. Optimization selector 650 may be an interactive element that a client may use to specify a goal for training the machine learning model, for example training the model for optimize accuracy in predictions versus shorted time to generate predictions. For example, as depicted in FIG. 6, a field corresponding to the prompt "Optimize for" is set to "Accuracy (Correct Prediction Rate)" specifying that the cloud service should generate a CNN machine learning model in an manner that optimizes a model's ability to predict accuracy output labels.

Interface 600 includes resource selector 660. Resource selector 660 may be an interactive element that a client may use to specify a type of processing hardware (e.g. sometimes based on a subscription-based aspect relating to the client) for creating the machine learning model. For example, as depicted in FIG. 6, a field corresponding to the prompt "Performance Tier" is set to "Gold Tier (Premium GPU Processing)," specifying that the cloud service should generate a CNN machine learning model using a GPU architecture. As described above, different types of computing resources may process data and/or train a machine learning model is less time. For example, GPUs are often optimized for machine learning training due to the specific architecture utilized by GPU logical circuits. Thus, the same training may be performed faster on a GPU than a central processing unit (CPU). The type of hardware may be factored into the creation of the machine learning model at runtime (e.g. a GPU is expected to be able to run more training epochs than a CPU, and the hyperparameters may be tuned with this expectation in mind.

Interface 600 includes model generation button 670, which may be an interactive button that a client may press to begin the process of generating and training a machine learning model. For example once a client has entered an input for each of data fields 610-660, model generation button, which is depicted in FIG. 6 with the text "BEGIN MODEL GENERATION," may be pressed to indicate that the client has entered all data relevant to generate training data to be sent to the cloud service, and corresponding data should be packages and sent thereto.

Figure 7:
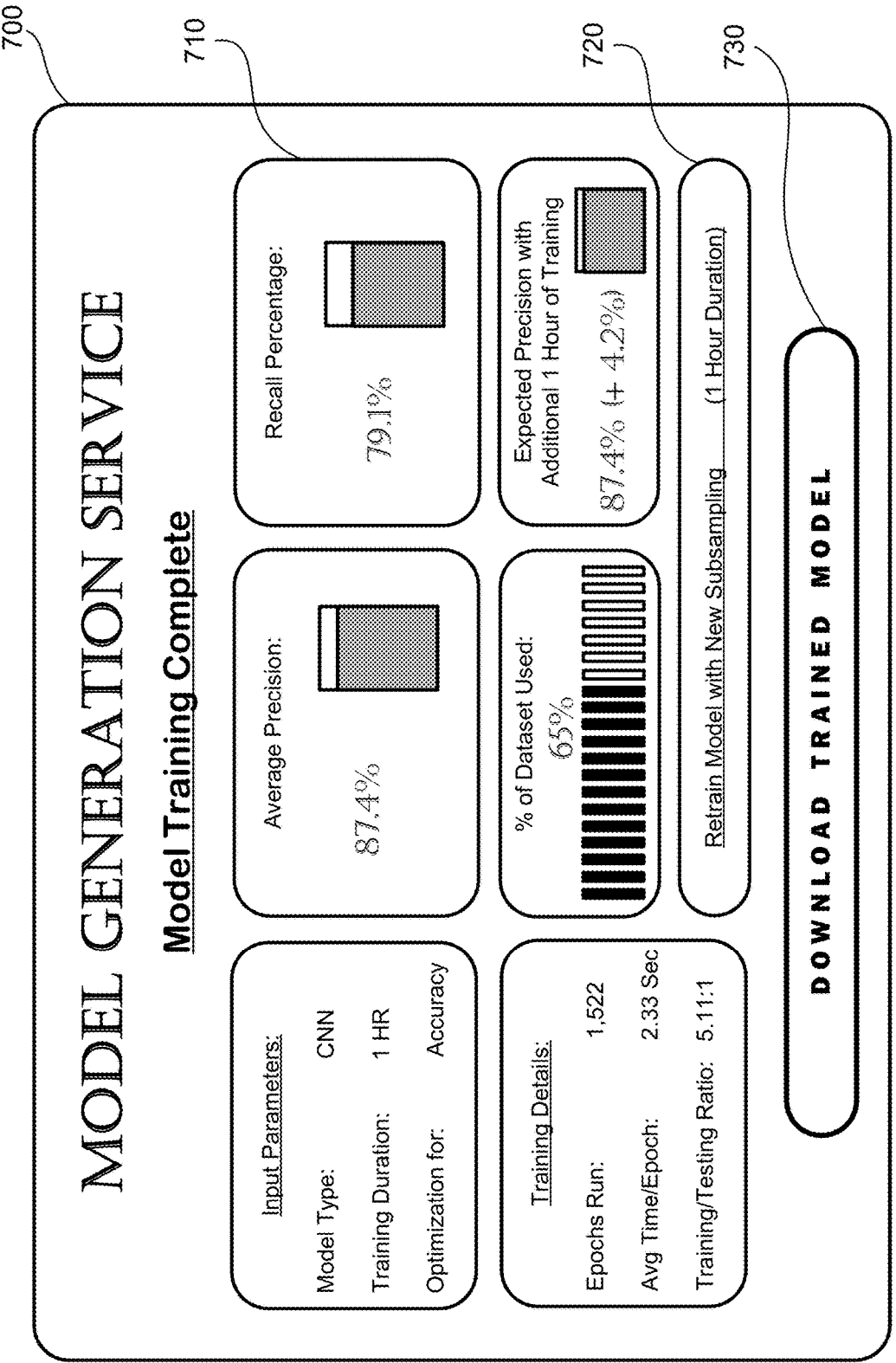
FIG. 7 depicts an example graphical interface and dashboard for viewing results of the training of a custom machine learning model according to certain embodiments of the present disclosure.

FIG. 7 depicts an example graphical interface and dashboard for viewing results of the training of a custom machine learning model according to certain embodiments of the present disclosure. Specifically, FIG. 7 depicts an example GUI that explains results of training a machine learning model, for example in response to pressing model generation button 670 in interface 600. Thus, interface 700 may represent an interface visible to a client after the client has requested the creation of a machine learning model and after the machine learning model has been generated and trained during the specified time constrained period.

Interface 700 as depicted in FIG. 7 includes a set of results widgets, such as results widget 710. The results widgets on interface 700 depict aspects of the client input specifications for the trained machine learning model as well as training/testing metrics gleaned from the creation of the machine learning model. For example, a first widget labelled "Input Parameters" repeats several specified parameters of model creation shown in FIG. 6. Another widget labelled "Average Precision" indicates the average precision of the trained machine learning model after the model has been tested following training. Another widget labelled "Recall Percentage" indicates a recall rate of the trained machine learning model after the model has been tested following training. Another widget labelled "training details" includes a number of tracked metrics gleaned from the training and testing of the machine learning model, including the number of epochs run in the specified time period, the average time take for each epoch to complete, and a ratio of training dataset utilized versus testing datasets used to test the model.

In various embodiments, a client may accept a machine learning model after it has been created or may specify that further training of the model should be performed. For example, additional widgets labelled "% of Dataset Used" and "Expected Precision with Additional 1 Hour of Training" should the percentage of the client-supplied training dataset that was included in the sub sampling and an estimated increase in precision of the model following an additional period of training, respectively. A client may, for example, press retraining button 720 to cause retraining of the machine learning model for an additional hour to further optimize the model. In some embodiments, a new subsampling of the client-supplied training datasets will be performed to ensure training on new datasets not previously used to train the machine learning model. Interface 700 also includes model download button 730, which the client may interact with to immediately obtain the trained machine learning model following the end of the time constrained period.

Example Infrastructure-as-a-Service System

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
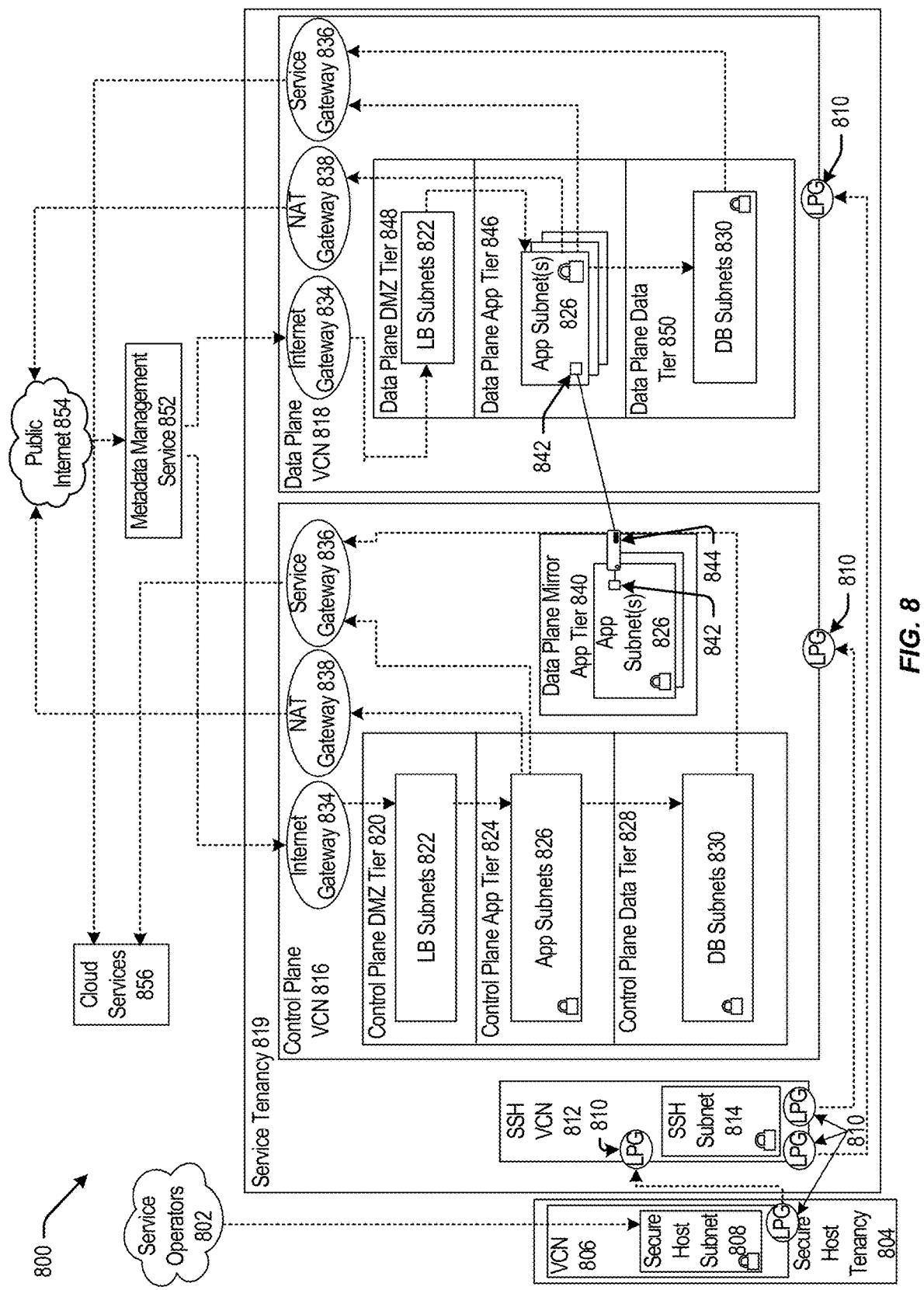
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
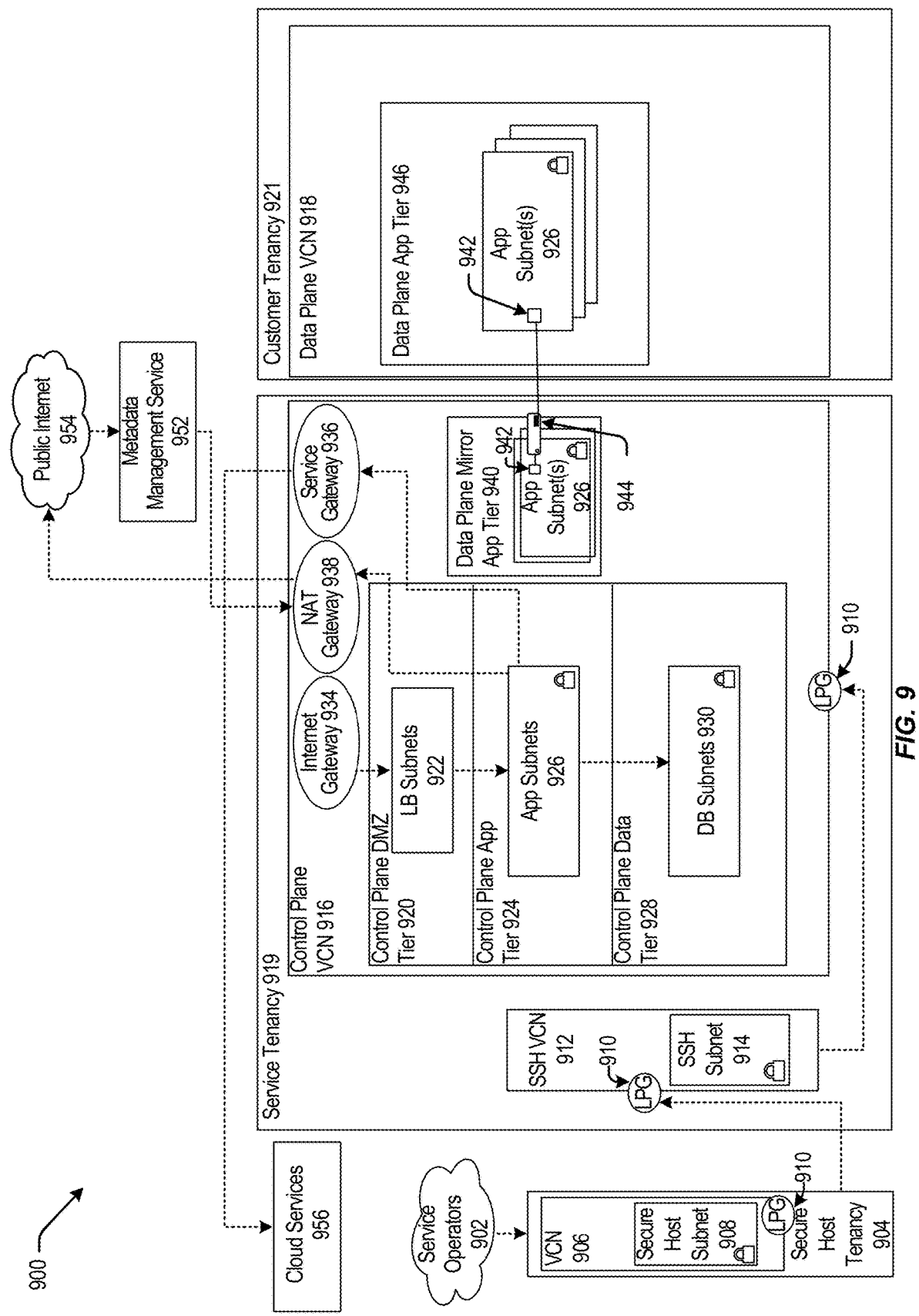
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 636 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC 842 of FIG. 8) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
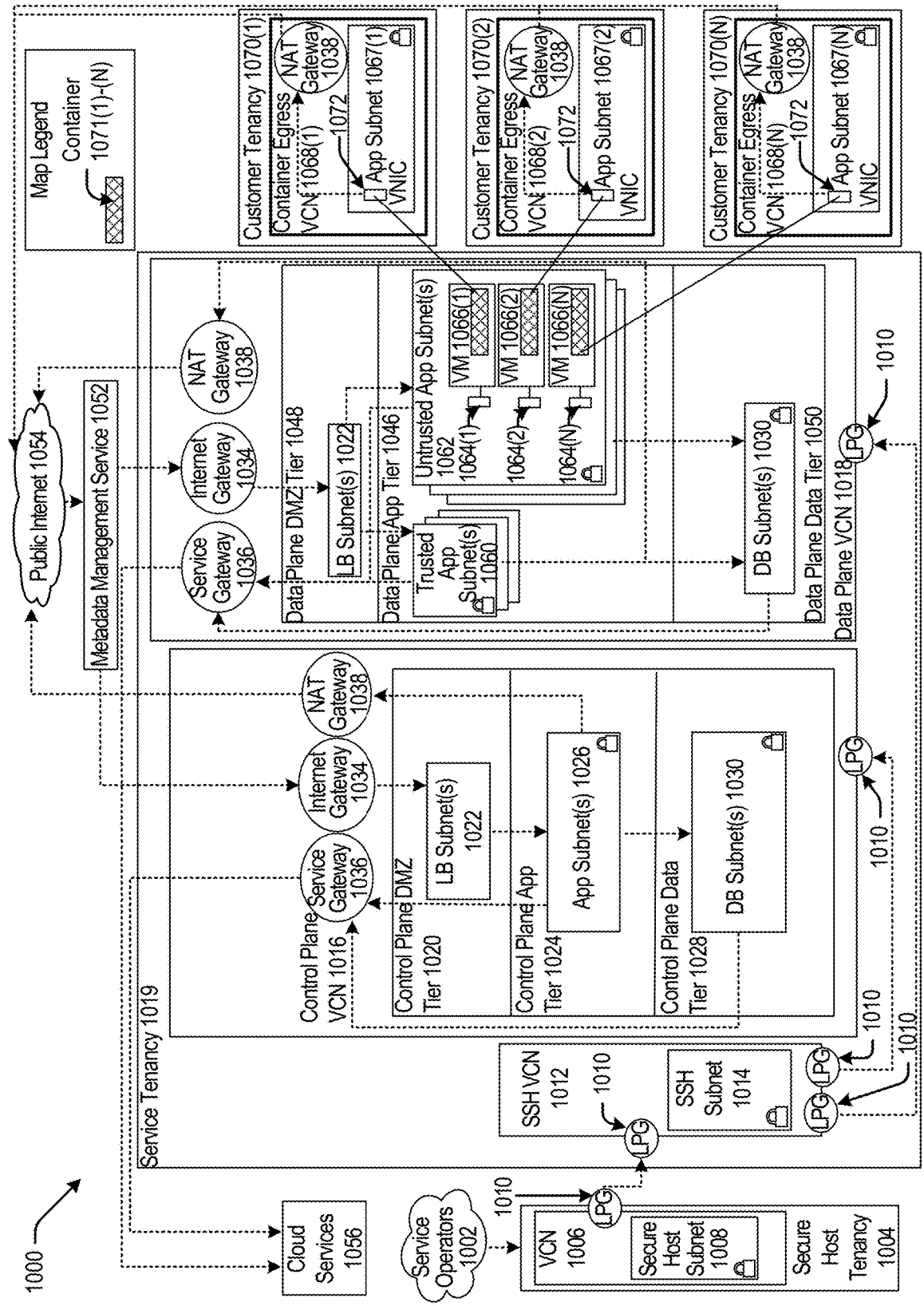
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway 836 of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
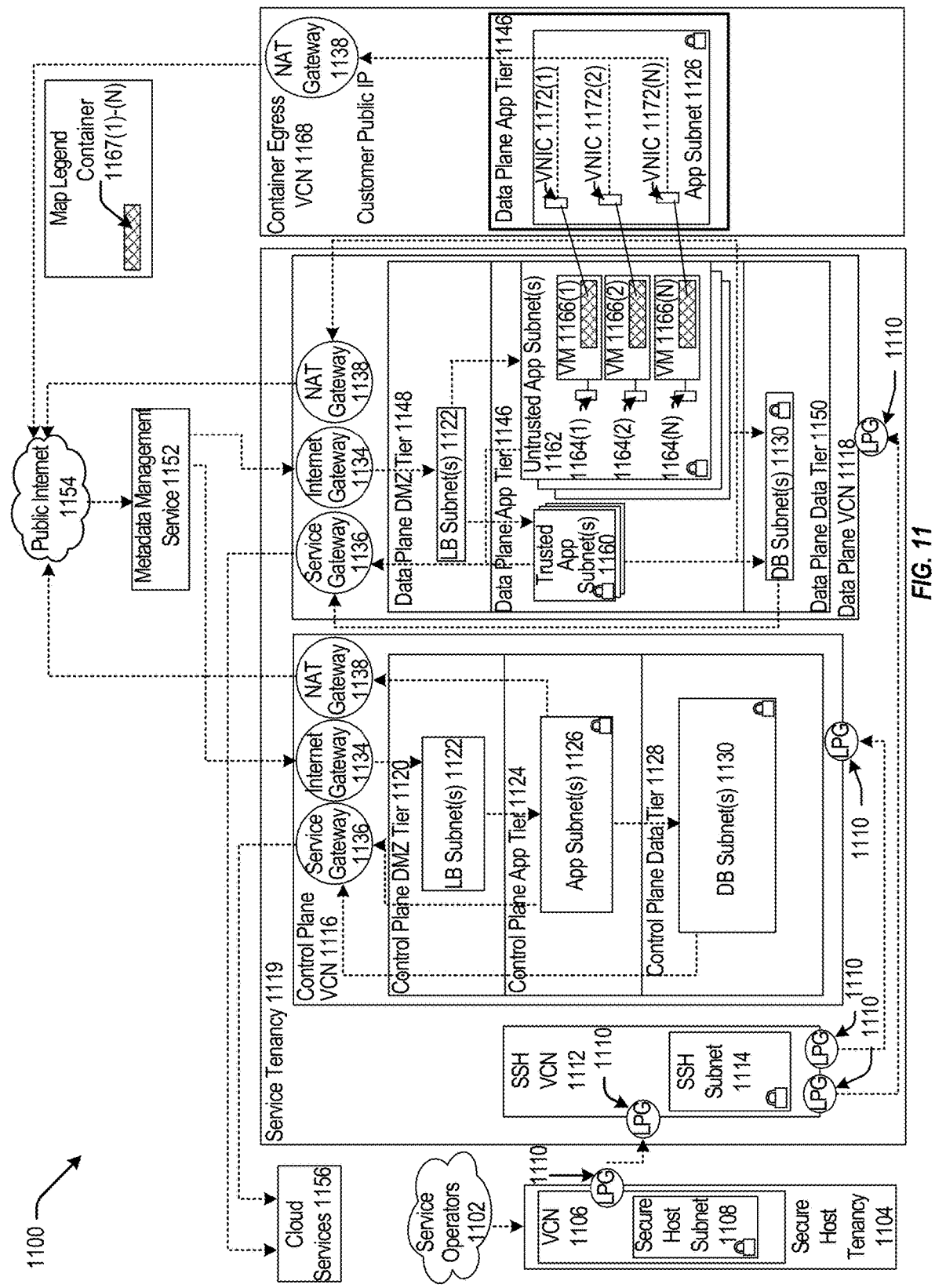
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
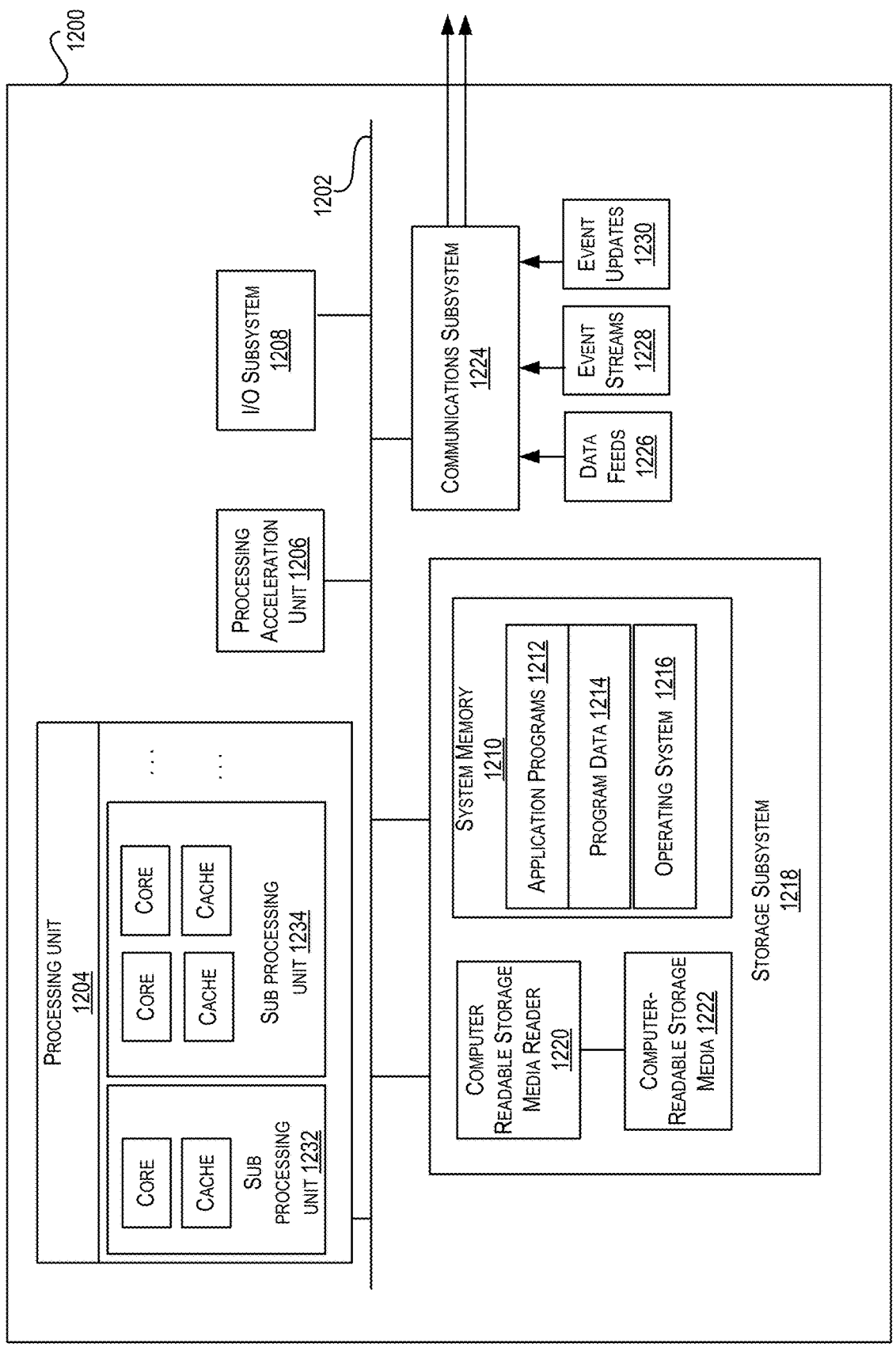
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri (ID navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:
1. A method, comprising:
  receiving, by a computing device, training data, the training data comprising one or more training datasets and an indication of a first time period;
  determining, by the computing device and based at least in part on the training data, a modified training dataset and one or more hyperparameter values for a machine learning model, the modified training dataset including a plurality of data objects that are input to the machine learning model to cause training of the machine learning model;
  determining, by the computing device and based at least in part on the modified training dataset and the first time period, one or more training iterations, each training iteration of the one or more training iterations corresponding to a second time period and the one or more training iterations corresponding to a total time period that is less than or equal to the first time period;
  for each training iteration in the one or more training iterations, training, by the computing device, the machine learning model using the one or more hyperparameter values and the modified training dataset, and the modified training dataset comprising the plurality of data objects in a unique sequence; and
  outputting, by a computing device, the trained machine learning model.

2. The method of claim 1, wherein:
the training data is received from a client device communicatively coupled to the computing device; and
the computing device outputs the trained machine learning model to the client device in response to receiving the training data.

3. The method of claim 1, wherein:
the trained machine learning model is a convolutional neural network machine learning model configured to receive input data including one or more digital images and output, based at least in part on the input data, one or more predictions associated with the one or more digital images;
the one or more training datasets comprise one or more first digital images; and
the modified training dataset comprises one or more second digital images that are a subset of the one or more first digital images.

4. The method of claim 1, wherein determining the modified training dataset comprises determining, by the computing device, a subset of the one or more training datasets based at least in part on one or more features of the training data and generating the modified training dataset including the subset of the one or more training datasets.

5. The method of claim 1, wherein determining the one or more hyperparameter values for the machine learning model comprises:
determining, by the computing device and based at least in part on the modified training dataset and the machine learning model a set of hyperparameters for training the machine learning model;
selecting, by the computing device and based at least in part on the first time period, a subset of hyperparameters of the set of hyperparameters; and
generating, by the computing device and using a mutating genetic algorithm and during a second time period that is less than the first time period, a set of one or more values for the subset of hyperparameters.

6. The method of claim 1, wherein determining the one or more training iterations comprises:
performing, by the computing device, an initial training of the machine learning model using the one or more hyperparameter values and the modified training dataset;
determining, by the computing device, an initial time period corresponding to the initial training; and
determining, by the computing device, a number of initial time periods that, in summation, are less than or equal time to the first time period.

7. The method of claim 1, wherein:
the computing device comprises a processing infrastructure of a processing type: and
determining the modified training dataset, the one or more hyperparameter values, and the one or more training iterations is further based at least in part on the processing type of the computing device.

8. The method of claim 1, further comprising:
comparing, by the computing device, a number of data objects in the one or more training datasets to an object threshold; and
determining, by the computing device, that the number of data objects in the one or more training datasets exceeds the object threshold, wherein determining the modified training dataset comprises including a number of data objects from the one or more training datasets in the modified training dataset that is less than or equal to the object threshold.

9. The method of claim 1, further comprising:
generating, by the computing device and using the one or more training datasets, one or more testing metrics for the trained machine learning model; and
outputting the one or more testing metrics.

10. A system comprising:
one or more data processors; and
a non-transitory computer-readable storage medium comprising instructions which, when executed on the one or more data processors, cause the one or more data processors to perform:
receiving training data comprising one or more training datasets and an indication of a first time period;
determining, based at least in part on the training data, a modified training dataset and one or more hyperparameter values for a machine learning model, the modified training dataset including a plurality of data objects that are input to the machine learning model to cause training of the machine learning model;
determining, based at least in part on the modified training dataset and the first time period, one or more training iterations, each training iteration of the one or more training iterations corresponding to a second time period and the one or more training iterations corresponding to a total time period that is less than or equal to the first time period;
for each training iteration in the one or more training iterations, training the machine learning model using the one or more hyperparameter values and the modified training dataset, and the modified training dataset comprising the plurality of data objects in a unique sequence; and
outputting the trained machine learning model.

11. The system of claim 10, wherein:
the training data is received from a client device communicatively coupled to the computing device; and
the computing device outputs the trained machine learning model to the client device in response to receiving the training data.

12. The system of claim 10, wherein:
the trained machine learning model is a convolutional neural network machine learning model configured to receive input data including one or more digital images and output, based at least in part on the input data, one or more predictions associated with the one or more digital images;
the one or more training datasets comprise one or more first digital images; and
the modified training dataset comprises one or more second digital images that are a subset of the one or more first digital images.

13. The system of claim 10, wherein determining the modified training dataset comprises determining, by the computing device, a subset of the one or more training datasets based at least in part on one or more features of the training data and generating the modified training dataset including the subset of the one or more training datasets.

14. The system of claim 10, wherein determining the one or more hyperparameter values for the machine learning model comprises:
determining, by the computing device and based at least in part on the modified training dataset and the machine learning model a set of hyperparameters for training the machine learning model;
selecting, by the computing device and based at least in part on the first time period, a subset of hyperparameters of the set of hyperparameters; and generating, by the computing device and using a mutating genetic algorithm and during a second time period that is less than the first time period, a set of one or more values for the subset of hyperparameters.

15. The system of claim 10, wherein determining the one or more training iterations comprises:
performing, by the computing device, an initial training of the machine learning model using the one or more hyperparameter values and the modified training dataset;
determining, by the computing device, an initial time period corresponding to the initial training; and
determining, by the computing device, a number of initial time periods that, in summation, are less than or equal time to the first time period.

16. The system of claim 10, wherein:
the system further comprises a processing device of a processing type; and
determining the modified training dataset, the one or more hyperparameter values, and the one or more training iterations is further based at least in part on the processing type of the processing device.

17. A non-transitory computer-readable storage medium storing a plurality of instructions executable by one or more processors of a computer, the plurality of instructions when executed by the one or more processors cause the one or more processors to perform:
receiving, by a computing device, training data, the training data comprising one or more training datasets and an indication of a first time period;
determining, by the computing device and based at least in part on the training data, a modified training dataset and one or more hyperparameter values for a machine learning model, the modified training dataset including a plurality of data objects that are input to the machine learning model to cause training of the machine learning model;
determining, by the computing device and based at least in part on the modified training dataset and the first time period, one or more training iterations, each training iteration of the one or more training iterations corresponding to a second time period and the one or more training iterations corresponding to a total time period that is less than or equal to the first time period;
for each training iteration in the one or more training iterations, training, by the computing device, the machine learning model using the one or more hyperparameter values and the modified training dataset, and the modified training dataset comprising the plurality of data objects in a unique sequence; and
outputting, by a computing device, the trained machine learning model.

18. The non-transitory computer-readable storage medium storing a plurality of instructions of claim 17, the one or more processors further performing:
comparing, by the computing device, a number of data objects in the one or more training datasets to an object threshold; and
determining, by the computing device, that the number of data objects in the one or more training datasets exceeds the object threshold, wherein determining the modified training dataset comprises including a number of data objects from the one or more training datasets in the modified training dataset that is less than or equal to the object threshold.

* * * * *

UNITED STATES PATENT AND TRADEMARK OFFICE
CERTIFICATE OF CORRECTION

PATENT NO. : 12,230,020 B2
APPLICATION NO. : 17/586583
DATED : February 18, 2025
INVENTOR(S) : Olaleye et al.

Page 1 of 1

It is certified that error appears in the above-identified patent and that said Letters Patent is hereby corrected as shown below:

In the Specification

In Column 32, Line 13, delete "Siri (ID" and insert -- Siri® --, therefor.

In the Claims

In Column 39, Line 18, in Claim 16, delete "type;" and insert -- type: --, therefor.

Signed and Sealed this
Twenty-fourth Day of June, 2025

Coke Morgan Stewart
*Acting Director of the United States Patent and Trademark Office*